(12) United States Patent
Inoue et al.

(10) Patent No.: US 10,710,342 B2
(45) Date of Patent: Jul. 14, 2020

(54) BIODEGRADABLE LAMINATE

(71) Applicant: THE NIPPON SYNTHETIC CHEMICAL INDUSTRY CO., LTD., Osaka (JP)

(72) Inventors: Kaoru Inoue, Osaka (JP); Yasuhiro Hirano, Osaka (JP); Kaname Kida, Osaka (JP)

(73) Assignee: MITSUBISHI CHEMICAL CORPORATION, Tokyo (JP)

( * ) Notice: Subject to any disclaimer, the term of this patent is extended or adjusted under 35 U.S.C. 154(b) by 0 days.

(21) Appl. No.: 14/357,315

(22) PCT Filed: Nov. 8, 2012

(86) PCT No.: PCT/JP2012/078965
§ 371 (c)(1),
(2) Date: May 9, 2014

(87) PCT Pub. No.: WO2013/069726
PCT Pub. Date: May 16, 2013

(65) Prior Publication Data
US 2014/0308534 A1   Oct. 16, 2014

(30) Foreign Application Priority Data

Nov. 11, 2011  (JP) .................................. 2011-247332
Mar. 7, 2012    (JP) .................................. 2012-050716

(51) Int. Cl.
*B32B 27/08*     (2006.01)
*C08F 283/02*    (2006.01)
(Continued)

(52) U.S. Cl.
CPC ............... *B32B 27/08* (2013.01); *B32B 7/04* (2013.01); *B32B 7/12* (2013.01); *B32B 27/28* (2013.01); *B32B 27/306* (2013.01); *B32B 27/36* (2013.01); *C08F 283/02* (2013.01); *C09J 4/06* (2013.01); *C09J 151/08* (2013.01); *B32B 7/10* (2013.01); *B32B 27/30* (2013.01); *B32B 2250/03* (2013.01); *B32B 2250/24* (2013.01); *B32B 2307/716* (2013.01); *B32B 2307/7163* (2013.01); *B32B 2307/7242* (2013.01); *B32B 2307/7244* (2013.01); *B32B 2329/04* (2013.01); *B32B 2367/00* (2013.01); *B32B 2410/00* (2013.01); *C08G 63/12* (2013.01); *C08G 63/123* (2013.01); *C08G 63/127* (2013.01);
(Continued)

(58) Field of Classification Search
None
See application file for complete search history.

(56) References Cited

U.S. PATENT DOCUMENTS 4,810,581 A    3/1989  Toshiyuki et al.
5,100,720 A *  3/1992  Sawada .................... C08J 7/045
                                                      428/215
(Continued)

FOREIGN PATENT DOCUMENTS

EP   2 325 228 A  *  5/2011
JP   S61-53377 A     3/1986
(Continued)

OTHER PUBLICATIONS

Werner, Eberhard et al., "Polyester, Films." Encyclopedia of Polymer Science and Engineering, vol. 12 (1988), pp. 193-216.*
(Continued)

*Primary Examiner* — Vivian Chen
(74) *Attorney, Agent, or Firm* — Greenblum & Bernstein, P.L.C.

(57) ABSTRACT

A biodegradable laminate, wherein a polyvinyl alcohol resin layer is laminated on at least one surface of an aliphatic polyester resin layer through an adhesive layer, which is excellent in biodegradability and gas barrier properties, and also excellent in interlayer adhesiveness, is obtained. The adhesive layer comprises, as a main component, a polyester resin (A') which has a polar group and is obtained by graft polymerization of an α,β-unsaturated carboxylic acid or an anhydride thereof on a biodegradable polyester resin (A) comprising at least one structural unit selected from structural units represented by the following general formulae (1), (2), and (3):

[Chem. 1]

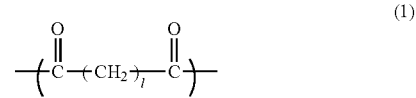

(wherein *l* is an integer of 2 to 6)

[Chem. 2]

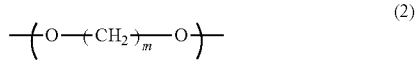

(wherein *m* is an integer of 2 to 6)

[Chem. 3]

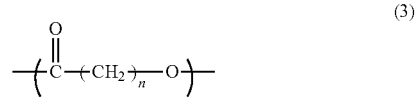

(wherein *n* is an integer of 2 to 6.).

8 Claims, No Drawings

(51) Int. Cl.

| | | |
|---|---|---|
| B32B 27/36 | (2006.01) | |
| C09J 151/08 | (2006.01) | |
| B32B 7/12 | (2006.01) | |
| B32B 7/04 | (2019.01) | |
| C09J 4/06 | (2006.01) | |
| B32B 27/28 | (2006.01) | |
| B32B 27/30 | (2006.01) | |
| B32B 7/10 | (2006.01) | |
| C08G 63/183 | (2006.01) | |
| C08G 63/127 | (2006.01) | |
| C08G 63/52 | (2006.01) | |
| C08G 63/91 | (2006.01) | |
| C08G 63/16 | (2006.01) | |
| C08G 63/181 | (2006.01) | |
| C08G 63/12 | (2006.01) | |
| C08G 63/123 | (2006.01) | |
| C08G 63/54 | (2006.01) | |
| C09J 167/02 | (2006.01) | |
| C09J 167/08 | (2006.01) | |
| C09J 167/03 | (2006.01) | |
| C08L 67/03 | (2006.01) | |
| C08L 67/08 | (2006.01) | |
| C08L 67/02 | (2006.01) | |
| C08L 67/04 | (2006.01) | |

(52) U.S. Cl.
CPC ......... *C08G 63/16* (2013.01); *C08G 63/181* (2013.01); *C08G 63/183* (2013.01); *C08G 63/52* (2013.01); *C08G 63/54* (2013.01); *C08G 63/912* (2013.01); *C08G 63/914* (2013.01); *C08L 67/02* (2013.01); *C08L 67/03* (2013.01); *C08L 67/04* (2013.01); *C08L 67/08* (2013.01); *C09J 167/02* (2013.01); *C09J 167/03* (2013.01); *C09J 167/08* (2013.01); *C09J 2429/00* (2013.01); *C09J 2429/006* (2013.01); *C09J 2467/00* (2013.01); *C09J 2467/006* (2013.01); *Y10T 428/1352* (2015.01); *Y10T 428/1379* (2015.01); *Y10T 428/31786* (2015.04); *Y10T 428/31797* (2015.04)

(56) References Cited

U.S. PATENT DOCUMENTS

| | | | | |
|---|---|---|---|---|
| 5,180,765 | A * | 1/1993 | Sinclair | A61L 15/26 521/124 |
| 5,403,897 | A * | 4/1995 | Ebato | C08G 63/60 428/480 |
| 5,525,671 | A * | 6/1996 | Ebato | C08G 63/00 525/386 |
| 5,536,564 | A * | 7/1996 | Noda | A61L 15/26 428/193 |
| 5,617,721 | A * | 4/1997 | Slawson | F01N 3/2033 60/277 |
| 5,747,633 | A * | 5/1998 | Ito | B65D 1/0207 428/35.7 |
| 5,883,199 | A * | 3/1999 | McCarthy | A61L 15/26 428/35.2 |
| 5,955,402 | A * | 9/1999 | Hirata | C08L 67/02 508/100 |
| 6,124,384 | A * | 9/2000 | Shiraishi | B65D 65/466 524/35 |
| 6,306,492 | B1 * | 10/2001 | Yamada | B32B 27/36 428/317.7 |
| 2002/0127358 | A1 * | 9/2002 | Berlin | B32B 27/10 428/36.6 |
| 2004/0024141 | A1 * | 2/2004 | Hasebe | C08K 5/103 525/418 |
| 2004/0068059 | A1 * | 4/2004 | Katayama | C08G 18/4277 525/466 |
| 2004/0092672 | A1 * | 5/2004 | Bastioli | B32B 27/36 525/450 |
| 2007/0203261 | A1 * | 8/2007 | Narayan | C08K 9/08 523/205 |
| 2008/0027178 | A1 * | 1/2008 | Uradnisheck | C08L 67/04 525/190 |
| 2008/0050603 | A1 * | 2/2008 | Randall | C08G 63/912 428/480 |
| 2008/0057309 | A1 * | 3/2008 | Liu | D01F 8/14 428/375 |
| 2008/0152904 | A1 * | 6/2008 | Murakami | B32B 7/12 428/355 CN |
| 2008/0160327 | A1 * | 7/2008 | Knoerzer | B32B 7/12 428/457 |
| 2008/0311813 | A1 * | 12/2008 | Ting | B32B 7/12 442/327 |
| 2009/0110945 | A1 * | 4/2009 | Yasui | B32B 7/12 428/523 |
| 2009/0171037 | A1 * | 7/2009 | Aoshima | C08G 63/16 525/418 |
| 2009/0186990 | A1 * | 7/2009 | Inui | C08J 5/18 525/411 |
| 2009/0191371 | A1 * | 7/2009 | Uradnisheck | B32B 27/08 428/35.7 |
| 2009/0253865 | A1 * | 10/2009 | Shibutani | B41M 5/44 525/59 |
| 2009/0278279 | A1 * | 11/2009 | Uradnisheck | B29C 51/428 264/210.1 |
| 2009/0286909 | A1 * | 11/2009 | Shibutani | C08L 29/04 524/114 |
| 2009/0312493 | A1 * | 12/2009 | Huang | C08L 29/04 525/58 |
| 2010/0119749 | A1 * | 5/2010 | Twist | B32B 27/30 428/36.7 |
| 2010/0136354 | A1 * | 6/2010 | Taniguchi | B29C 55/005 428/500 |
| 2010/0221560 | A1 * | 9/2010 | Knoerzer | B32B 27/08 428/458 |
| 2010/0266858 | A1 * | 10/2010 | Chopinez | B32B 27/06 428/457 |
| 2010/0279135 | A1 * | 11/2010 | Kitora | B32B 27/32 428/516 |
| 2011/0003919 | A1 * | 1/2011 | Yamanaka | C08G 63/06 524/147 |
| 2011/0171489 | A1 * | 7/2011 | Dou | B29C 55/023 428/623 |
| 2014/0227544 | A1 * | 8/2014 | Inoue | C09D 129/04 428/483 |

FOREIGN PATENT DOCUMENTS

| | | | |
|---|---|---|---|
| JP | 11-49925 | A | 2/1999 |
| JP | 2000-8014 | A | 1/2000 |
| JP | 2000-177072 | A | 6/2000 |
| JP | 2002-121240 | * | 4/2002 |
| JP | 2002/155135 | A | 5/2002 |
| JP | 2002-348366 | * | 12/2002 |
| JP | 2003-291262 | * | 10/2003 |
| JP | 2005-336468 | A * | 12/2005 |
| JP | 2006-016605 | A * | 1/2006 |
| JP | 2006-130847 | A * | 5/2006 |
| JP | 2007-161795 | * | 6/2007 |
| JP | 2008-155385 | A | 7/2008 |
| JP | 2008-155433 | A | 7/2008 |
| JP | 2009-196287 | * | 9/2009 |
| JP | 2009-196287 | A | 9/2009 |
| JP | 2009-227882 | A * | 10/2009 |
| JP | 2010-525962 | A | 7/2010 |
| WO | 1997/047670 | A1 | 12/1997 |

OTHER PUBLICATIONS

Schimtz, Peter et al., "Films." Ullmann's Encyclopedia of Industrial Chemistry, 5th Ed., vol. A11 (1988), pp. 85-110.*

(56) References Cited

OTHER PUBLICATIONS

"Wikipedia—Polyethylene Terephthalate" (https://en.wikipedia.org/wiki/Polyethylene_terephthalate (webpage retrieved Feb. 3, 2017).*
European Search Report issued in respect of application No. 12848164.5, dated Mar. 31, 2015.
International search report issue for PCT/JP2012/078965, dated Feb. 12, 2013.

* cited by examiner

BIODEGRADABLE LAMINATE

TECHNICAL FIELD

The present invention relates to a laminate having an aliphatic polyester resin layer and a polyvinyl alcohol resin layer, and more particularly relates to a biodegradable laminate which has biodegradability and excellent gas barrier properties, and also has excellent interlayer adhesiveness.

BACKGROUND ART

Plastics are excellent in moldability, strength, water resistance, transparency, and the like, and therefore are widely used as packaging materials. Examples of the plastics to be used as packaging materials include polyolefin resins such as polyethylene and polypropylene; vinyl resins such as polystyrene and polyvinyl chloride; and aromatic polyester resins such as polyethylene terephthalate. However, these plastics have low biodegradability, and therefore, when they are dumped in nature after use, they remain for a long period of time and therefore may spoil the landscape or cause environmental disruption in some cases.

On the other hand, recently, a biodegradable resin, which is biodegraded or hydrolyzed in soil or water, and therefore is useful for the prevention of environmental pollution, has drawn attention, and the practical application thereof has been studied. As such a biodegradable resin, an aliphatic polyester resin, cellulose acetate, modified starch, and the like are known, but as a packaging material, an aliphatic polyester resin having excellent transparency, heat resistance, and strength, particularly polylactic acid is preferred.

However, such an aliphatic polyester resin has insufficient oxygen gas barrier properties, and therefore cannot be used alone as a packaging material for a content which may be oxidatively degraded such as a food or a drug. Therefore, a laminate having a coating layer formed from polyvinyl alcohol having excellent gas barrier properties and also having biodegradability on at least one surface of a polylactic acid film has been proposed (see, for example, Patent Document 1).

Further, a biodegradable laminate which uses a melt-moldable polyvinyl alcohol resin having a 1,2-diol structure in its side chain and is obtained by coextrusion-laminating an aliphatic polyester resin whose melting point is different from that of the polyvinyl alcohol resin by 20° C. or less on both surfaces thereof (see, for example, Patent Document 2).

CITATION LIST

Patent Literature

Patent Document 1: JP-A-2000-177072
Patent Document 2: JP-A-2009-196287

SUMMARY OF INVENTION

Problems to Be Solved by the Invention

Since the surface properties of an aliphatic polyester resin are largely different from those of a polyvinyl alcohol resin (hereinafter abbreviated as "PVA resin"), the adhesiveness between these resins is poor, and therefore, it is difficult to obtain practically usable interlayer adhesion strength by directly laminating these resin layers. For example, Patent Document 1 proposes a surface activation treatment to be applied to a polylactic acid film such as a corona discharge treatment, a flame treatment, or an ozone treatment, or an anchor coating treatment, however, there is still a lot of room for improvement.

Further, in Patent Document 2, the interlayer adhesiveness between an aliphatic polyester resin layer and a PVA resin layer is slightly improved by coextrusion-lamination, but is not enough for practical application.

Means for Solving the Problems

The present invention solves the problem by providing a laminate, in which an aliphatic polyester resin layer and a PVA resin layer are laminated through an adhesive layer, and the laminate has favorable interlayer adhesiveness by using an adhesive having favorable adhesiveness to both of the aliphatic polyester resin and the PVA resin and also having biodegradability as the adhesive layer, and is composed only of biodegradable components.

However, an adhesive exhibiting favorable adhesiveness to both of the aliphatic polyester resin and the PVA resin and also having biodegradability has not been found yet.

Accordingly, the present inventors made intensive studies in view of the above circumstances, and as a result, they found that the object of the present invention is achieved by a laminate, wherein an aliphatic polyester resin layer and a PVA resin layer are laminated through an adhesive layer which comprises, as a main component, a polyester resin (A') which has a polar group and is obtained by graft polymerization of an α,β-unsaturated carboxylic acid or an anhydride thereof on a polyester resin (A) comprising at least one structural unit selected from structural units represented by the following general formulae (1), (2), and (3), and thus completed the invention.

[Chem. 1]

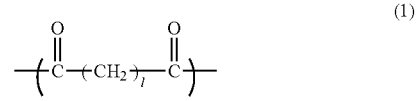

(In the formula, $l$ is an integer of 2 to 6.)

[Chem. 2]

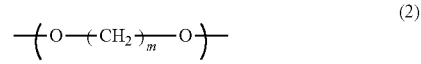

(In the formula, $m$ is an integer of 2 to 6.)

[Chem. 3]

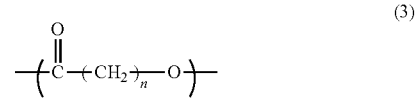

(In the formula, $n$ is an integer of 2 to 6.)

It is inferred that due to the similarity of the basic structure between the polyester resin (A') which has a polar group and serves as the main component of the adhesive layer and the aliphatic polyester resin layer, and also due to the favorable affinity for the PVA resin layer attributed to the polar group of the polyester resin (A'), excellent interlayer adhesiveness to both layers is obtained.

It is inferred that the graft polymerization of an α,β-unsaturated carboxylic acid (or an anhydride thereof) on an aliphatic polyester resin (A) having a structural unit represented by the general formula (1), (2), or (3) occurs in an alkylene chain moiety in the general formula (1), (2), or (3).

The present invention includes the following embodiments.

[1] A biodegradable laminate, wherein a polyvinyl alcohol resin layer is laminated on at least one surface of an aliphatic polyester resin layer through an adhesive layer, characterized in that the adhesive layer comprises, as a main component, a polyester resin (A') which has a polar group and is obtained by graft polymerization of an α,β-unsaturated carboxylic acid or an anhydride thereof on a biodegradable polyester resin (A) comprising at least one structural unit selected from structural units represented by the following general formulae (1), (2), and (3):

[Chem. 1]

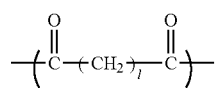

(1)

wherein $l$ is an integer of 2 to 6,

[Chem. 2]

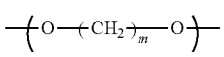

(2)

wherein $m$ is an integer of 2 to 6,

[Chem. 3]

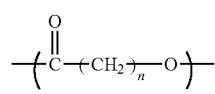

(3)

wherein $n$ is an integer of 2 to 6.

[2] The laminate described in [1], wherein the adhesive layer comprises the polyester resin (A') in an amount of 50% by weight or more.

[3] The laminate described in [1] or [2], wherein the polyester resin (A') comprises the polar group in an amount of 0.0001 to 6% by mole with respect to the structural units.

[4] The laminate described in any one of [1] to [3], wherein the polyvinyl alcohol resin has a structural unit represented by the following general formula (4):

[Chem. 7]

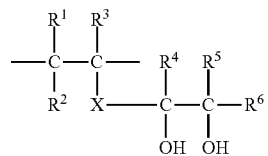

(4)

wherein each of $R^1$, $R^2$, and $R^3$ independently represents a hydrogen atom or an organic group; X represents a single bond or a linking chain; and each of $R^4$, $R^5$, and $R^6$ independently represents a hydrogen atom or an organic group.

[5] The laminate described in any one of [1] to [4], wherein the aliphatic polyester resin layer is a dehydrated condensate of an aliphatic hydroxycarboxylic acid or an alternating dehydrated condensate of an aliphatic dicarboxylic acid and an aliphatic diol.

[6] The laminate described in [5], wherein the aliphatic polyester resin layer comprises polylactic acid.

[7] An agricultural film, comprising the biodegradable laminate described in any one of [1] to [6].

Effects of Invention

The laminate of the present invention has gas barrier properties and biodegradability, and further has excellent interlayer adhesiveness, and therefore is useful as a packaging material for foods and drugs.

Embodiments for Carrying Out the Invention

The following explanation of the constituent elements is one example (typical example) of the present invention, and the invention should not be construed as being limited to the contents.

The following will explain the present invention in detail.

The biodegradable laminate of the present invention is a laminate in which an aliphatic polyester resin layer and a PVA resin layer are laminated through an adhesive layer, and the adhesive layer comprises, as a main component, a polyester resin (A') which has a polar group and is obtained by graft polymerization of an α,β-unsaturated carboxylic acid or an anhydride thereof on a polyester resin (A) comprising at least one structural unit selected from structural units represented by the general formulae (1), (2), and (3).

Hereinafter, the respective layers of the biodegradable laminate and a production method thereof are described in detail.

[Adhesive Layer]

First, the adhesive layer to be interposed between the aliphatic polyester resin layer and the PVA resin layer in the biodegradable laminate of the present invention is described.

The adhesive layer comprises a polyester resin (A') having a polar group as a main component. The content of the polyester resin (A') in the adhesive layer is generally 50% by weight or more, preferably 70% by weight or more, and more preferably 90% by weight or more.

The polyester resin (A') having a polar group is obtained by graft polymerization of an α,β-unsaturated carboxylic acid or an anhydride thereof on a polyester resin (A) comprising at least one structural unit selected from structural units represented by the following general formulae (1) to (3).

[Chem. 8]

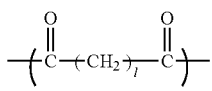

(1)

(In the formula, $l$ is an integer of 2 to 6.)

[Chem. 9]

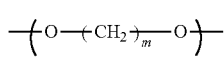

(2)

(In the formula, $m$ is an integer of 2 to 6.)

-continued

[Chem. 10]

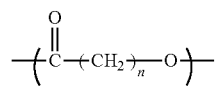
(3)

(In the formula, $n$ is an integer of 2 to 6.)

The polyester resin (A) to be used in the present invention is an aliphatic polyester resin, and therefore is biodegradable. Further, the polyester resin (A') obtained by introducing a polar group into the polyester resin (A) also comprises an aliphatic polyester as the basic structure, and is a resin obtained by slightly modifying the aliphatic polyester, and therefore is biodegradable.

First, the structural unit represented by the general formula (1) is derived from a dibasic acid to be used as a starting material, and the number of carbon atoms in the alkylene chain in the structural formula "1" is 2 to 6, and particularly, one having 2 to 4 carbon atoms is preferably used.

Specific examples thereof include succinic acid (1=2), glutaric acid (1=3), adipic acid (1=4), 1,5-pentanedicarboxylic acid (1=5), and 1,6-hexanedicarboxylic acid (1=6), and particularly, adipic acid is preferably used.

The structural unit represented by the general formula (2) is derived from a diol to be used as a starting material, and the number of carbon atoms in the alkylene chain in the structural formula "m" is 2 to 6, and particularly, one having 2 to 4 carbon atoms is preferably used.

Specific examples thereof include ethylene glycol (m=2), propylene glycol (m=3), 1,4-butanediol (m=4), 1,5-pentanediol (m=5), and 1,6-hexanediol (m=6).

The structural unit represented by the general formula (3) is derived from a hydroxycarboxylic acid to be used as a starting material, and the number of carbon atoms in the alkylene chain in the structural formula "n" is 2 to 6, and particularly, one having 2 to 4 carbon atoms is preferably used.

Specific examples thereof include 4-hydroxybutyric acid (n=3), 5-hydroxyvaleric acid (n=4), and 6-hydroxyhexanoic acid (n=5).

The starting materials to become the structural units represented by the general formulae (1) to (3) can be used alone, and also can be used in combination of two or more thereof. Further, a hydrogen atom in the alkylene chain of each structural unit may be substituted in such a small amount that the biodegradability of the resin is not impaired, for example, in the case of a hydrocarbon group, an alkyl group such as a methyl group or an ethyl group, and, for example, an unsaturated $C_{2-10}$ alkyl group.

The polyester resin (A) to be used in the present invention is a polyester resin having at least one structural unit selected from structural units represented by the above general formulae (1) to (3), and is desirably composed only of these structural units from the viewpoint of biodegradability, however, for the purpose of controlling heat resistance, strength, and biodegradability, and so on, another structural unit may be contained therein. The content of a structural unit other than the structural units represented by the general formulae (1) to (3) is generally 50% by mole or less, preferably 30% by mole or less, and more preferably 10% by mole or less.

Examples of the other structural units include those derived from aromatic dicarboxylic acids such as terephthalic acid and isophthalic acid; those derived from dicarboxylic acids having less than two alkylene chains such as oxalic acid and malonic acid; those derived from hydroxycarboxylic acids having less than two alkylene chains such as glycolic acid and lactic acid; and other than these, those known as a copolymerizable component of polyester resins.

The weight average molecular weight of the polyester resin (A) to be used in the present invention is generally from 5,000 to 50,000, preferably from 5,500 to 40,000, and particularly preferably from 6,000 to 30,000. If the polymerization degree is too high, the melt viscosity is increased, and thus, it tends to be difficult to melt-mold the polyester resin (A). On the other hand, if the polymerization degree is too low, the resulting molded body tends to be brittle.

Examples of a commercially available product of the polyester resin (A) include "Ecoflex" manufactured by BASF Corporation containing a polycondensate of adipic acid/terephthalic acid with 1,4-butanediol as a main component, and "GS-PLA" manufactured by Mitsubishi Chemical Corporation containing a polycondensate of succinic acid/1,4-butanediol/lactic acid as a main component.

In the present invention, specific examples of the α,β-unsaturated carboxylic acid or an anhydride thereof to be used for the introduction of a polar group by graft polymerization on the polyester resin (A) include α,β-unsaturated monocarboxylic acids such as acrylic acid and methacrylic acid; and α,β-unsaturated dicarboxylic acids such as maleic acid, fumaric acid, itaconic acid, citrus acid, tetrahydrophthalic acid, crotonic acid, and isocrotonic acid, and preferably, an α,β-unsaturated dicarboxylic acid is used.

The present invention is not limited to the case where one type of these α,β-unsaturated carboxylic acid compounds is used alone, and two or more types thereof may be used in combination.

The method for graft polymerization of an α,β-unsaturated carboxylic acid on the polyester resin (A) is not particularly limited, and a known method can be used. The graft polymerization can be carried out only by a thermal reaction, however, in order to increase the reactivity, it is preferred to use a radical initiator. Further, as a method for carrying out the reaction, a solution reaction, a reaction in a suspension state, a reaction in a molten state without using a solvent or the like, can be adopted, however, among these, the reaction is preferably carried out in a molten state.

As a melting method, a method in which the polyester resin (A), an α,β-unsaturated carboxylic acid compound, and a radical initiator are mixed in advance, and then, the resulting mixture is melt-kneaded in a kneader to carry out the reaction; a method in which an α,β-unsaturated carboxylic acid compound and a radical initiator are blended in the polyester resin (A) in a molten state in a kneader; or the like can be used.

As a mixer to be used when mixing the starting materials in advance, a Henschel mixer, a ribbon blender, or the like is used, and as a kneader to be used for the melt-kneading, a single- or twin-screw extruder, a roll, a Banbury mixer, a kneader, a Brabender mixer, or the like can be used.

The temperature during the melt-kneading may be appropriately set to a temperature equal to or higher than the melting point of the polyester resin (A) within a temperature range in which thermal degradation is not caused. The melt-mixing is carried out at preferably 100 to 270° C., more preferably 160 to 250° C.

The used amount of the α,β-unsaturated carboxylic acid is generally in the range from 0.0001 to 5 parts by weight with respect to 100 parts by weight of the polyester resin (A), and particularly a range from 0.001 to 2 parts by weight, more particularly a range from 0.02 to 1 part by weight is preferably used. If the blend amount thereof is too small, a sufficient amount of the polar group is not introduced into the polyester resin (A), and therefore, the interlayer adhesiveness, particularly the adhesion strength to the PVA resin layer tends to be insufficient. Further, if the blended amount thereof is too large, the α,β-unsaturated carboxylic acid which is not graft-polymerized sometimes remains in the resin, and therefore, poor appearance or the like due to the remaining α,β-unsaturated carboxylic acid tends to occur.

The radical initiator is not particularly limited, and a known radical initiator can be used, however, examples thereof include organic and inorganic peroxides such as t-butyl hydroperoxide, cumene hydroperoxide, 2,5-dimethylhexane-2,5-dihydroperoxide, 2,5-dimethyl-2,5-bis(t-butyloxy)hexane, 3,5,5-trimethylhexanoyl peroxide, t-butyl peroxybenzoate, benzoyl peroxide, m-toluoyl peroxide, dicumyl peroxide, 1,3-bis(t-butylperoxyisopropyl)benzene, dibutyl peroxide, methyl ethyl ketone peroxide, potassium peroxide, and hydrogen peroxide; azo compounds, such as 2,2'-azobisisobutyronitrile, 2,2'-azobis(isobutylamide) dihalides, 2,2'-azobis[2-methyl-N-(2-hydroxyethyl)propionamide], and azodi-t-butane; and carbon radical generators such as dicumyl.

These may be used alone or can be used in combination of two or more thereof.

The blend amount of the radical initiator is generally in the range from 0.00001 to 2.0 parts by weight with respect to 100 parts by weight of the polyester resin (A), and particularly a range from 0.0001 to 1.0 parts by weight, more particularly a range from 0.002 to 0.5 parts by weight is preferably used.

If the blended amount of the radical initiator is too small, the graft polymerization is not sufficiently carried out, and therefore, the effect of the present invention is sometimes not obtained, and if the blended amount thereof is too large, the molecular weight of the polyester resin is decreased due to the degradation of the resin, and therefore, the adhesion strength tends to be insufficient due to low aggregability.

The introduced amount of the polar group into the polyester resin (A) by the α,β-unsaturated carboxylic acid, in other words, the content of the polar group in the polyester resin (A') having the polar group is generally in the range from 0.0001 to 6% by mole, and particularly a range from 0.001 to 1% by mole, more particularly a range from 0.025 to 0.6% by mole is preferably selected. The content expressed as % by mole is based on the structural units (1) to (3) of the polyester resin (A).

If the content thereof is too small, the interlayer adhesiveness, particularly the adhesion strength to the PVA resin layer tends to be insufficient. On the other hand, if the introduction amount thereof is too large, the stability during thermal melt-molding tends to be decreased.

Here, the content of the polar group can be determined from a spectrum obtained by $^1$H-NMR measurement or IR measurement.

In the biodegradable laminate of the present invention, an adhesive comprising the above-described polyester resin (A') having a polar group as a main component is used as the adhesive layer to be interposed between the aliphatic polyester resin layer and the PVA resin layer.

[Aliphatic Polyester Resin Layer]

Next, the aliphatic polyester resin layer in the biodegradable laminate of the present invention is described.

The aliphatic polyester resin layer is a layer comprising an aliphatic polyester resin as a main component, and comprises an aliphatic polyester resin in an amount of generally 70% by weight or more, particularly 80% by weight or more, and more particularly 90% by weight or more.

Examples of the aliphatic polyester resin constituting the aliphatic polyester resin layer include a dehydrated condensate of an aliphatic hydroxycarboxylic acid and an alternating dehydrated condensate of an aliphatic dicarboxylic acid and an aliphatic diol.

Specific examples of the aliphatic hydroxycarboxylic acid include lactic acid and glycolic acid, and the resin may be a homopolymer or a copolymer composed of a plurality of different monomers.

Further, examples of the aliphatic dicarboxylic acid include succinic acid, glutaric acid, adipic acid, pimelic acid, suberic acid, azelaic acid, sebacic acid, undecanedioic acid, dodecanedioic acid, cyclopentanedicarboxylic acid, and cyclohexanedicarboxylic acid. In general, an aliphatic dicarboxylic acid having 4 to 12 carbon atoms is used, and particularly an aliphatic dicarboxylic acid having 4 to 8 carbon atoms is preferably used from the viewpoint of biodegradability. These aliphatic dicarboxylic acids can be used alone, but can also be used in combination of two or more thereof for obtaining desired properties.

Further, examples of the aliphatic diol include ethylene glycol, triethylene glycol, 1,4-butanediol, pentamethylene glycol, 1,8-octylene glycol, nanomethylene glycol, and decamethylene glycol. In general, an aliphatic diol having 2 to 10 carbon atoms is used, and particularly, an aliphatic diol having 2 to 6 carbon atoms is preferably used from the viewpoint of biodegradability. Also in the case of the aliphatic diol, in the same manner as the aliphatic dicarboxylic acid, these illustrated aliphatic diols may be used alone or in combination of two or more thereof.

Further, it is also possible to use a resin obtained by copolymerization of an aliphatic hydroxycarboxylic acid together with an aliphatic dicarboxylic acid and an aliphatic diol.

Examples of a commercially available product of the aliphatic polyester resin include "Bionolle" which is a polymer of succinic acid, 1,4-butanediol, and adipic acid and is manufactured by Showa High Polymer Co., Ltd. and "Cellgreen" which is a ring-opening polymer of ε-caprolactone and is manufactured by Daicel Chemical Co., Ltd.

Among these aliphatic polyester resins, polylactic acid which is a dehydrated condensate of lactic acid is preferred since it is excellent in heat resistance, moisture-proof performance, transparency, mechanical strength, and flexibility.

Hereinafter, polylactic acid is described in detail.

Polylactic acid is an aliphatic polyester resin comprising a lactic acid structural unit as a main component, and is a polymer obtained by using L-lactic acid, D-lactic acid, or a cyclic dimer thereof, namely, L-lactide, D-lactide, or DL-lactide as a starting material.

Polylactic acid to be used in the present invention is preferably a homopolymer of any of these lactic acids, however, a copolymer component other than the lactic acids may be contained therein as long as the amount thereof does not impair the properties, for example, the amount thereof is 10% by mole or less.

Examples of such a copolymer component include the above-described aliphatic hydroxycarboxylic acids, aliphatic dicarboxylic acids, aliphatic diols, and the like.

Further, the content ratio (L/D) of the L-lactic acid component to the D-lactic acid component in the polylactic acid is generally 95/5 or more, and particularly, polylactic acid having a content ratio (L/D) of 99/1 or more, more particularly 99.8/0.2 is preferably used. As the value of the content ratio is increased, the melting point of the polylactic acid is increased to improve the heat resistance. On the other hand, as the value of the content ratio is decreased, the melting point of the polylactic acid is decreased, and therefore the heat resistance tends to be insufficient. Specifically, in the case of a homopolymer of polylactic acid, the homopolymer has a melting point of 152° C. if L/D is 95/5, 171° C. if L/D is 99/1, and 175° C. or higher if L/D is 99.8/0.2.

Further, the weight average molecular weight of the polylactic acid to be used in the present invention is generally from 20,000 to 1,000,000, particularly from 30,000 to 300,000, and more particularly from 40,000 to 200,000. If the weight average molecular weight thereof is too large, the melt viscosity during thermal melt-molding is too high, and therefore, it tends to be difficult to perform favorable film formation. On the other hand, if the weight average molecular weight thereof is too small, the mechanical strength of the resulting laminate tends to be insufficient.

Examples of a commercially available product of the polylactic acid resin include "Ingeo" manufactured by NatureWorks LLC, "Lacea" manufactured by Mitsui Chemicals Incorporated, "REVODE" manufactured by Zhejiang Hisun Biomaterials Co., Ltd., and "VYLOECOL" manufactured by TOYOBO Co., Ltd.

Further, the polylactic acid layer in the biodegradable laminate of the present invention may comprise a biodegradable resin other than polylactic acid as long as the effect of the present invention is not significantly impaired, and examples of the biodegradable resin include the above-described aliphatic polyester resins and modified starch resins.

Further, in the polylactic acid layer of the present invention, a heat stabilizing agent, an antioxidant, a UV absorbent, a crystal nucleating agent, an antistatic agent, a flame retardant, a plasticizer, a lubricant, a filler lubricant, a crystal nucleating agent, a plasticizer, or the like may be blended, other than the above-described polylactic acid and biodegradable resin.

[PVA Resin Layer]

Next, the PVA resin layer in the biodegradable laminate of the present invention is described.

The PVA resin layer particularly bears the gas barrier properties of the laminate, and is laminated on at least one surface of the below-described polylactic acid layer through the below-described adhesive layer.

The PVA resin layer of the present invention is a layer comprising a PVA resin as a main component, and comprises a PVA resin in an amount of generally 70% by weight or more, particularly 80% by weight or more, and more particularly 90% by weight or more. If the content thereof is too small, the gas barrier properties tend to be insufficient.

The PVA resin to be used in the PVA resin layer is a resin comprising as a main structural unit, a vinyl alcohol structural unit, and obtained by saponification of a polyvinyl ester resin obtained by copolymerization of a vinyl ester monomer, and is composed of a vinyl alcohol structural unit in an amount equivalent to the saponification degree and a vinyl ester structural unit.

Examples of the vinyl ester monomer include vinyl formate, vinyl acetate, vinyl propionate, vinyl valerate, vinyl butyrate, vinyl isobutyrate, vinyl pivalate, vinyl caprate, vinyl laurate, vinyl stearate, vinyl benzoate, and vinyl versatate. However, it is preferred to use vinyl acetate from the economical viewpoint.

The average polymerization degree (obtained by measurement according to JIS K 6726) of the PVA resin to be used in the present invention is generally from 200 to 1,800, and particularly, a PVA resin having an average polymerization degree of 300 to 1,500, more particularly 300 to 1,000 is preferably used.

If the average polymerization degree thereof is too small, the mechanical strength of the PVA resin layer tends to be insufficient. On the other hand, if the average polymerization degree is too large, the fluidity tends to be poor to decrease the moldability when the PVA resin layer is formed by thermal melt-molding, and further, shear heat is abnormally generated during molding, and thus, the resin is liable to be thermally degraded in some cases.

Further, the saponification degree (obtained by measurement according to JIS K 6726) of the PVA resin to be used in the present invention is generally from 80 to 100% by mole, and particularly a PVA resin having a saponification degree of 90 to 99.9% by mole, more particularly 98 to 99.9% by mole is preferably used.

If the saponification degree is too low, the gas barrier properties tend to be decreased.

Further, in the present invention, as the PVA resin, a PVA resin obtained by copolymerization of a variety of monomers when producing a polyvinyl ester resin, followed by saponification, or any of a variety of modified PVA resins having a variety of functional groups introduced into unmodified PVA by post-modification can be used.

Examples of the monomer to be used in the copolymerization with a vinyl ester monomer include olefins such as ethylene, propylene, isobutylene, α-octene, α-dodecene, and α-octadecene; hydroxy group-containing α-olefins such as 3-buten-1-ol, 4-penten-1-ol, 5-hexen-1-ol, and 3,4-dihydroxy-1-butene, and derivatives thereof such as acylated compounds thereof; unsaturated acids such as acrylic acid, methacrylic acid, crotonic acid, maleic acid, maleic anhydride, and itaconic acid, and salts thereof, monoesters thereof, and dialkyl esters thereof; nitriles such as acrylonitrile and methacrylonitrile; amides such as diacetone acrylamide, acrylamide, and methacrylamide; olefin sulfonic acids such as ethylene sulfonic acid, allyl sulfonic acid, and methallyl sulfonic acid, and salts thereof; vinyl compounds such as alkyl vinyl ethers, dimethyl allyl vinyl ketone, N-vinylpyrrolidone, vinyl chloride, vinyl ethylene carbonate, 2,2-dialkyl-4-vinyl-1,3-dioxolane, glycerin monoallyl ether, and 3,4-diacetoxy-1-butene; substituted vinyl acetates such as isopropenyl acetate and 1-methoxyvinyl acetate; vinylidene chloride, 1,4-diacetoxy-2-butene, and vinylene carbonate.

Further, examples of the PVA resin having a functional group introduced therein by the post-reaction include a resin having an acetoacetyl group introduced by a reaction with a diketene, a resin having a polyalkylene oxide group introduced by a reaction with ethylene oxide, a resin having a hydroxyalkyl group introduced by a reaction with an epoxy compound or the like, and a resin obtained by reacting an aldehyde compound having any of a variety of functional groups with PVA.

The content of the modified species in the modified PVA resin, that is, the structural unit derived from each type of monomer in the copolymer or the functional group introduced by the post-reaction is generally from 1 to 20% by mole, and particularly, a range from 2 to 10% by mole is preferably used, though it cannot be specified definitely because the properties greatly vary depending on the modified species.

Among these various types of modified PVA resins, in the present invention, a PVA resin with a structural unit having a 1,2-diol structure in its side chain represented by the following general formula (4) is preferably used in the below-described method for producing a laminate of the present invention from the viewpoint of ease of melt-molding.

In the general formula (4), each of $R^1$, $R^2$, and $R^3$ independently represents a hydrogen atom or an organic group; X represents a single bond or a linking chain; and each of $R^4$, $R^5$, and $R^6$ independently represents a hydrogen atom or an organic group.

[Chem. 11]

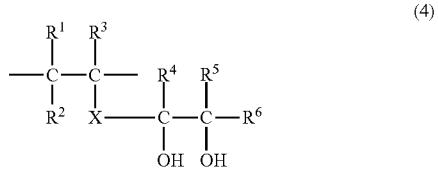

(4)

In particular, a PVA resin having a structural unit represented by the following general formula (4'), wherein in the 1,2-diol structural unit represented by the general formula (4), $R^1$ to $R^3$, and $R^4$ to $R^6$ are all a hydrogen atom, and X is a single bond is most preferred.

[Chem. 12]

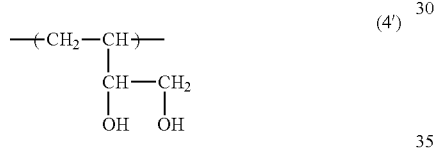

(4')

$R^1$ to $R^3$, and $R^4$ to $R^6$ in the structural unit represented by the general formula (4) may be an organic group as long as the amount thereof does not significantly impair the properties of the resin. Examples of the organic group include alkyl groups having 1 to 4 carbon atoms such as a methyl group, an ethyl group, an n-propyl group, an isopropyl group, an n-butyl group, an isobutyl group, and a tert-butyl group, and the organic group may have a functional group such as a halogen group, a hydroxy group, an ester group, a carboxylic acid group, a sulfonic acid group as needed.

Further, X in the 1,2-diol structural unit represented by the general formula (4) is most preferably a single bond from the viewpoint of thermal stability and stability at high temperatures or under acidic conditions, but may be a linking chain as long as it does not impair the effect of the present invention. Examples of the linking chain include hydrocarbons (which may be substituted with a halogen such as fluorine, chlorine, or bromine, or the like) such as alkylene, alkenylene, alkynylene, phenylene, and naphthylene, and also include —O—, —(CH$_2$O)m-, —(OCH$_2$)m-, —(CH$_2$O)mCH$_2$—, —CO—, —COCO—, —CO(CH$_2$)mCO—, —CO(C$_6$H$_4$)CO—, —S—, —CS—, —SO—, —SO$_2$—, —NR—, —CONR—, —RCO—, —CSNR—, —NRCS—, —NRNR—, —HPO$_4$—, —Si(OR)$_2$—, —OSi(OR)$_2$—, —OSi(OR)$_2$O—, —Ti(OR)$_2$—, —OTi(OR)$_2$—, —OTi(OR)$_2$O—, —Al(OR)—, —OAl(OR)—, and —OAl(OR)O—, (wherein each R is independently any substituent, and is preferably a hydrogen atom or an alkyl group, and m represents an integer of 1 to 5). Among these, from the viewpoint of stability during production or use, an alkylene group having 6 or less carbon atoms, particularly a methylene group, or —CH$_2$OCH$_2$— is preferred.

A method for producing such a PVA resin having a 1,2-diol structure in its side chain is not particularly limited, however, (i) a method in which a copolymer of a vinyl ester monomer with a compound represented by the following general formula (5) is saponified, (ii) a method in which a copolymer of a vinyl ester monomer with a compound represented by the following general formula (6) is saponified and decarboxylated, or (iii) a method in which a copolymer of a vinyl ester monomer with a compound represented by the following general formula (7) is saponified and deketalized is preferably used.

[Chem. 13]

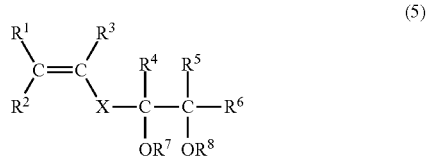

(5)

[Chem. 14]

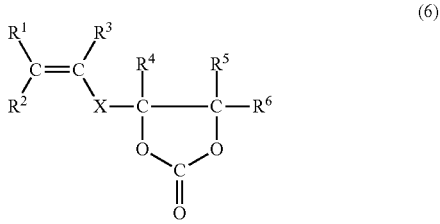

(6)

[Chem. 15]

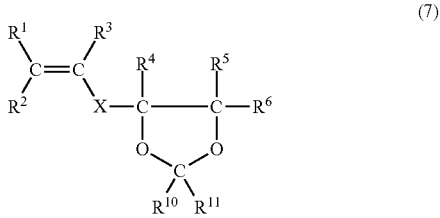

(7)

Each of $R^1$, $R^2$, $R^3$, X, $R^4$, $R^5$, and $R^6$ in the above-described general formulae (5), (6), and (7) is the same as in the case of the general formula (4). Further, each of $R^7$ and $R^8$ is independently a hydrogen atom or $R^9$—CO— (wherein $R^9$ is an alkyl group). Each of $R^{10}$ and $R^{11}$ is independently a hydrogen atom or an alkyl group.

As the methods described in (i), (ii), and (iii), for example, methods described in JP-A-2006-95825 can be used.

Among these, from the viewpoint of excellent copolymerization reactivity and excellent industrial handleability, in the method described in (i), as the compound represented by the general formula (5), 3,4-diacyloxy-1-butene is preferably used, and particularly, 3,4-diacetoxy-1-butene is preferably used.

The content of the 1,2-diol structural unit contained in the PVA resin having a 1,2-diol structure in its side chain is generally 1 to 20% by mole, and further, a PVA resin having a 1,2-diol structural unit content of 2 to 10% by mole, particularly 3 to 8% by mole is preferably used. If the content thereof is too small, it is difficult to obtain the effect of the 1,2-diol structure in the side chain. On the other hand, if the content thereof is too large, the gas barrier properties at high humidity tend to be significantly deteriorated.

The content of the 1,2-diol structural unit in the PVA resin can be determined from a $^1$H-NMR spectrum (solvent: DMSO-d6, internal standard: tetramethylsilane) of a completely saponified PVA resin. Specifically, the content thereof may be calculated based on the peak areas derived from a hydroxy proton, a methine proton, and a methylene proton in the 1,2-diol unit, a methylene proton in the main chain, a proton of a hydroxy group linked to the main chain, and the like.

Further, the PVA resin to be used in the present invention may be composed of one type of resin, or may be a mixture of two or more types of resins. In the case where the PVA resin is a mixture, a combination of the above-described unmodified PVA resins; an unmodified PVA resin with a PVA resin having a structural unit represented by the general formula (4); PVA resins each having a structural unit represented by the general formula (4) but having different saponification degree, polymerization degree, modification degree, or the like; an unmodified PVA resin or a PVA resin having a structural unit represented by the general formula (4) with another modified PVA resin, and the like can be used.

[Biodegradable Laminate]

The laminate of the present invention is a laminate in which a PVA resin layer is laminated on at least one surface of an aliphatic polyester resin layer through an adhesive layer comprising a polyester resin (A') having a polar group as a main component, and has a layer structure of generally 3 to 15 layers, preferably 3 to 7 layers, and particularly preferably 5 to 7 layers. The layer structure is not particularly limited, however, when the aliphatic polyester resin layer is represented by a, the PVA resin layer is represented by b, and the adhesive layer is represented by c, any combination such as a/c/b, a/c/b/c/a, or a/b/c/b/c/b/a is possible. The aliphatic polyester resin layers, the PVA resin layers, or the adhesive layers may be the same as or different from each other.

Generally, in order to prevent the gas barrier properties from deteriorating due to moisture absorption of the PVA resin layer, the laminate preferably has a layer structure in which the aliphatic polyester resin layer is provided as a layer in contact with the outside air or water-containing contents.

The thickness of the laminate of the present invention is generally from 1 to 30000 μm, and particularly, a range from 3 to 13000 μm, and more particularly, a range from 10 to 3000 μm is preferably used.

Further, as for the thickness of each layer constituting the laminate, the aliphatic polyester resin layer has a thickness of generally from 0.4 to 14000 μm, preferably from 1 to 6000 μm, and particularly preferably from 4 to 1400 μm. If the thickness of a polylactic acid layer is too large, the laminate tends to be stiff. On the other hand, if the thickness thereof is too small, the laminate tends to be brittle.

The PVA resin layer has a thickness of generally from 0.1 to 1000 μm, preferably from 0.3 to 500 μm, and particularly preferably from 1 to 100 μm. If the thickness of the PVA resin layer is too large, the laminate tends to be stiff and brittle. On the other hand, if the thickness thereof is too small, the barrier properties tend to be decreased, and therefore, such a thickness is not preferred.

The adhesive layer has a thickness of generally from 0.1 to 500 μm, preferably from 0.15 to 250 μm, and particularly preferably from 0.5 to 50 μm. If the thickness of the adhesive layer is too large, the appearance is sometimes poor. On the other hand, if the thickness thereof is too small, the adhesion strength tends to be decreased.

As for the ratio of the thickness of the aliphatic polyester resin layer to the thickness of the PVA resin layer, in the case where the number of layers of each type is more than one, the ratio of the sum of the thicknesses of the aliphatic polyester resin layers to the sum of the thicknesses of the PVA resin layers is generally from 1 to 100, and preferably from 2.5 to 50. If the ratio is too large, the barrier properties tend to be decreased, and if the ratio is too small, the laminate tends to be stiff and brittle.

Further, as for the ratio of the thickness of the adhesive layer to the total thickness of the laminate, in the case where the number of the adhesive layers is more than one, the ratio of the sum of the thicknesses of the adhesive layers to the total thickness of the laminate is generally from 0.005 to 0.5, and preferably from 0.01 to 0.3. If the ratio is too large, the appearance tends to be poor, and if the ratio is too small, the adhesion strength tends to be low.

The laminate of the present invention can be produced by a conventionally known molding method, and specifically, a melt-molding method or a molding method in a solution state can be used. For example, as the melt-molding method, a method in which an adhesive resin and a PVA resin are sequentially or simultaneously laminated on an aliphatic polyester resin film or sheet by melt-extrusion, or a method in which an adhesive resin and an aliphatic polyester resin are sequentially or simultaneously laminated on a PVA resin film or sheet by melt-extrusion, or a method in which an aliphatic polyester resin, an adhesive resin, and a PVA resin are coextruded is adopted.

Further, as the molding method in a solution state, a method in which a solution obtained by dissolving an adhesive resin in a good solvent is solution coated on an aliphatic polyester resin film, sheet, or the like, followed by drying, and then, an aqueous solution of a PVA resin is solution coated thereon, or the like can be adopted.

Above all, a melt-molding method is preferred from the viewpoint that the production can be achieved by one step and a laminate having excellent interlayer adhesiveness is obtained, and particularly, a coextrusion method is preferably used. Further, in the case of using such a melt-molding method, as the PVA resin, a resin having a 1,2-diol structure in its side chain is preferably used.

Specific examples of the coextrusion method include an inflation method, a T-die method, a multi-manifold die method, a feed block method, and a multi-slot die method. As for the shape of the die in a die external bonding method or the like, a T-die, a circular die, or the like can be used.

The melt-molding temperature during melt-extrusion is in the range of generally from 190 to 250° C., preferably from 200 to 230° C.

The laminate of the present invention is preferably a laminate further subjected to a heat-stretching treatment, and by the stretching treatment, the improvement of the strength and the improvement of the gas barrier properties can be expected.

In particular, in the laminate of the present invention, when a PVA resin having a 1,2-diol structure in its side chain is used as the PVA resin, the stretchability is enhanced.

As the above-described stretching treatment or the like, a known stretching method can be adopted.

Specific examples thereof include a uniaxial stretching method and a biaxial stretching method, in which both ends of a multilayer structure sheet are held and the width of the sheet is increased; a molding method using a metal mold, in which a multilayer structure sheet is processed by stretching using a metal mold, such as a deep drawing molding method, a vacuum molding method, an air-pressure molding method, and a vacuum air-pressure molding method; and a method for processing a preformed multilayer structure body such as a parison using a tubular stretching method, a stretch blow method, or the like.

As the stretching method, in the case where a molded body in the form of a film or a sheet is desired to be formed, it is preferred to adopt a uniaxial stretching method or a biaxial stretching method.

Further, in the case of using a metal mold molding method such as a deep drawing molding method, a vacuum molding method, an air-pressure molding method, and a vacuum air-pressure molding method, it is preferred to uniformly heat the laminate using a hot-air oven or a heater oven, or using both in combination, or the like, and then, stretch the heated laminate using a chuck, a plug, a vacuum force, an air-pressure force, or the like.

In the case where a molded body having a drawing ratio (the depth (mm) of the molded product/the maximum diameter (mm) of the molded product) of generally from 0.1 to 3 such as a cup or a tray is desired to be formed, it is preferred to adopt a metal mold molding method, in which a stretching process is performed using a metal mold, such as a deep drawing molding method, a vacuum molding method, an air-pressure molding method, and a vacuum air-pressure molding method.

In thus obtained biodegradable laminate of the present invention, a high interlayer adhesion strength is achieved both between the aliphatic polyester resin and the adhesive layer, and between the PVA resin layer and the adhesive layer.

Further, the basic structure of the polyester resin (A') which has a polar group and serves as the main component of the adhesive layer is an aliphatic polyester resin, and therefore, such a resin is also biodegradable, and thus, also the laminate comprising such adhesive layer has excellent biodegradability.

The biodegradable laminate of the present invention has mechanical strength, flexibility, transparency, water resistance, moisture resistance, and biodegradability attributed to an aliphatic polyester resin, and also has mechanical strength, gas barrier properties, transparency, and biodegradability attributed to a PVA resin layer, and the aliphatic polyester resin layer and the PVA resin layer are strongly adhered to each other through an adhesive layer, and further, the adhesive layer is also biodegradable. Thus, the laminate of the present invention is the only laminate which is completely biodegradable and has excellent gas barrier properties.

The biodegradable laminate can be applied to various uses owing to the above-described properties, and is useful as, for example, packaging materials for goods whose characteristics should be prevented from degrading due to oxidation such as foods, drugs, metal components, and electronic components, or as a variety of agricultural films such as multifilms, fumigation films, seedling films, and covering films, and as agricultural materials.

EXAMPLES

Hereinafter, the present invention is explained with reference to Examples, however, the invention is not limited to the description of the Examples as long as it does not depart from the gist of the invention.

The terms "part(s)" and "%" in the description are in terms of weight unless otherwise indicated.

Example 1

[Preparation of Polyester Resin (A')]

As a polyester resin (A), 100 parts of an adipic acid/1,4-butanediol polycondensate ("Ecoflex C1200" manufactured by BASF Corporation), 0.1 parts of maleic anhydride, and as a radical initiator, 0.01 parts of 2,5-dimethyl-2,5-bis(t-butyloxy)hexane ("Perhexa 25B" manufactured by NOF Corporation) were dry-blended, and then, the resulting mixture was melt-kneaded under the following conditions by a twin-screw extruder and extruded in the form of a strand, followed by cooling with water. Then, the strand was cut by a pelletizer, whereby a polyester resin (A') having a polar group in a cylindrical pellet form was obtained.

Twin-Screw Extruder
  Diameter (D): 15 mm
  L/D: 60
  Revolutions of screw: 200 rpm
  Mesh: 90/90 mesh
  Processing temperature: 210° C.

[Preparation of PVA Resin]

In a reactor vessel equipped with a reflux condenser, a dropping funnel, and a stirrer, 68.0 parts of vinyl acetate, 23.8 parts of methanol, and 8.2 parts of 3,4-diacetoxy-1-butene were charged, and then, azobisisobutyronitrile was added thereto at 0.3% by mole (with respect to the amount of the charged vinyl acetate). Then, the temperature was increased in a nitrogen gas stream while stirring to initiate polymerization. When the polymerization degree of vinyl acetate reached 90%, m-dinitrobenzene was added thereto to terminate the polymerization. Subsequently, by a method of blowing methanol vapor, the unreacted vinyl acetate monomer was removed from the system, whereby a methanol solution of a copolymer was formed.

Then, the thus prepared methanol solution was further diluted with methanol to adjust the concentration to 45%, and charged in a kneader. While maintaining the temperature of the solution at 35° C., a methanol solution containing 2% sodium hydroxide was added thereto in an amount of 10.5 mmole with respect to 1 mole of the total amount of the vinyl acetate structural unit and the 3,4-diacetoxy-1-butene structural unit in the copolymer to carry out saponification. As the saponification proceeded, a saponified product was deposited, and when the form of the deposited saponified product was turned into a particle, the saponified product was separated by filtration, washed well with methanol, and dried in a hot-air dryer, whereby a desired PVA resin having a 1,2-diol structure in its side chain was prepared.

The saponification degree of the obtained PVA resin was analyzed based on an alkali consumption required for hydrolysis of remaining vinyl acetate and 3,4-diacetoxy-1-butene, and found to be 99.2% by mole. Further, the average polymerization degree was analyzed according to JIS K 6726, and found to be 450. Further, the content of the 1,2-diol structural unit represented by the general formula (4) was calculated based on an integrated value determined by $^1$H-NMR (300 MHz proton NMR, a d6-DMSO solution, internal standard substance: tetramethylsilane, 50° C.), and found to be 6% by mole.

[Preparation of Laminate]

By using polylactic acid ("Ingeo 4032D" manufactured by NatureWorks LLC) as an aliphatic polyester resin, a PVA resin, and a polyester resin (A') having a polar group as an adhesive, a laminate having a three-type five-layer structure of a polylactic acid layer/an adhesive layer/a PVA resin layer/an adhesive layer/a polylactic acid layer was prepared by a three-type five-layer multilayer film forming apparatus provided with three extruders. The thickness of the obtained laminate was 120 µm, and the thicknesses of the respective layers were as follows: 50 µm/5 µm/10 µm/5 µm/50 µm.

The set temperatures of the respective extruders and the roll are as follows.

Set temperatures

Polylactic acid: C1/C2/C3/C4/H/J=180/190/200/200/200/200° C.

PVA resin: C1/C2/C3/C4/H/J=180/200/210/210/210/210° C.

Adhesive resin: C1/C2/H/J=180/200/210/210° C.

Die: FD1/FD2/D1/D2/D3=200/200/200/200/200° C.

Roll: 60° C.

<Evaluation of Interlayer Adhesiveness>

The adhesion states between the polylactic acid layer and the adhesive layer and between the PVA resin layer and the adhesive layer in the obtained laminate were evaluated by hand peeling and determined according to the following criteria. The results are shown in Table 2.

A: The layers are strongly adhered to each other in either case, and when the layers are tried to be peeled from each other, the polylactic acid layer is torn off.

B: The layers are adhered to each other, however, when the layers are tried to be peeled from each other, they are separated from each other at the interface.

C: The layers are easily separated from each other (the layers are not adhered to each other).

Examples 2 to 5

Polyester resins (A') were prepared in the same manner as in Example 1 except that the blended amounts of the maleic anhydride and the radical initiator with respect to 100 parts of the polyester resin (A) in the preparation of the polyester resin (A') in Example 1 were changed as shown in Table 1, and also laminates were prepared in the same manner as in Example 1. Further, thus prepared laminates were evaluated in the same manner as in Example 1. The results are shown in Table 2.

Example 6

A laminate was prepared in the same manner as in Example 1 except that as the polyester resin (A) which is the starting material of the polyester resin (A') in Example 1, a succinic acid/1,4-butanediol polycondensate ("GsPla" manufactured by Mitsubishi Chemical Corporation) was used, and the thus prepared laminate was evaluated in the same manner as in Example 1. The result is shown in Table 2.

Comparative Example 1

A laminate was prepared in the same manner as in Example 1 except that as the polyester resin which is the starting material of the polyester resin (A') in Example 1, polylactic acid which is an aliphatic polyester resin having no structural units represented by the general formulae (1) to (3) was used, and the thus prepared laminate was evaluated in the same manner as in Example 1. The result is shown in Table 2.

TABLE 1

| | Biodegradable polyester resin | | Maleic anhydride | Radical initiator |
|---|---|---|---|---|
| Example 1 | Ecoflex | 100 parts | 0.1 parts | 0.01 parts |
| Example 2 | Ecoflex | 100 parts | 0.5 parts | 0.05 parts |
| Example 3 | Ecoflex | 100 parts | 0.05 parts | 0.005 parts |
| Example 4 | Ecoflex | 100 parts | 0.025 parts | 0.0025 parts |
| Example 5 | Ecoflex | 100 parts | 0.5 parts | 0.25 parts |
| Example 6 | GsPla | 100 parts | 0.1 parts | 0.01 parts |
| Comparative Example 1 | PLA | 100 parts | 0.1 parts | 0.01 parts |

Comparative Example 2

A laminate was prepared in the same manner as in Example 1 except that as the adhesive resin in Example 1, a polyester resin (A) which was not subjected to graft polymerization of maleic anhydride was used, and the thus obtained laminate was evaluated in the same manner as in Example 1. The result is shown in Table 2.

TABLE 2

| | Adhesiveness |
|---|---|
| Example 1 | A |
| Example 2 | B |
| Example 3 | A |
| Example 4 | A |
| Example 5 | A |
| Example 6 | B |
| Comparative Example 1 | C |
| Comparative Example 2 | C |

As apparent from these results, the laminates of the Examples obtained by laminating a polylactic acid resin layer and a PVA resin layer using a polyester resin (A') obtained by graft polymerization of maleic anhydride which is an α,β-unsaturated carboxylic acid derivative on a polyester resin (A) having a structural unit with an alkylene chain having 2 to 6 carbon atoms as an adhesive resin layer had excellent interlayer adhesiveness. On the other hand, in the laminate of Comparative Example 1 in which a resin obtained using polylactic acid which does not have such an alkylene chain by a graft polymerization operation thereon in the same manner as Example 1 was used as an adhesive layer, and in the laminate of Comparative Example 2 in which the polyester resin (A) which was not subjected to graft polymerization was used, sufficient interlayer adhesiveness could not be obtained.

This application is based on Japanese Patent Application filed on Nov. 11, 2011 (Patent Application No. 2011-247332) and Japanese Patent Application filed on Mar. 7, 2012 (Patent Application No. 2012-050716), and the contents thereof are incorporated herein by reference.

INDUSTRIAL APPLICABILITY

The laminate according to the present invention has gas barrier properties and biodegradability, and further has excellent interlayer adhesiveness, and therefore is useful as a variety of packaging materials for foods and drugs or as agricultural films.

The invention claimed is:

1. A biodegradable laminate comprising a polyvinyl alcohol resin layer laminated on at least one surface of an outer layer through an adhesive layer, the outer layer comprising at least one of polylactic acid and a succinic acid/1,4-butanediol/lactic acid polycondensate, wherein the adhesive layer comprises, in an amount of 90% by weight or more, a polyester resin (A') which has a polar group and is obtained by graft polymerization of an anhydride of maleic acid or itaconic acid on a biodegradable polyester resin (A) comprising an adipic acid/terephthalic acid/1,4-butanediol polycondensate;

wherein the amount of the anhydride of maleic acid or itaconic acid used in the graft polymerization is 0.025 to 0.5 parts by weight with respect to 100 parts by weight of the polyester resin (A).

2. The laminate according to claim 1, wherein the polyester resin (A') comprises the polar group in an amount of 0.0001 to 6% by mole with respect to the structural units.

3. The laminate according to claim 1, wherein the polyvinyl alcohol resin has a structural unit represented by the following formula (4):

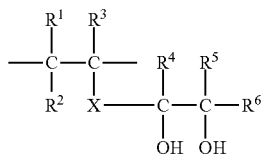

(4)

wherein each of $R^1$, $R^2$, and $R^3$ independently represents a hydrogen atom or an organic group; X represents a single bond or linking chain; and each of $R^4$, $R^5$, and $R^6$ independently represents a hydrogen atom or an organic group.

4. The laminate according to claim 1, wherein the outer layer comprises a succinic acid/1,4-butanediol/lactic acid polycondensate.

5. The laminate according to claim 1, wherein the polyvinyl alcohol resin layer is laminated on at least one surface of a layer comprising polylactic acid.

6. An agricultural film, comprising the biodegradable laminate according to claim 1.

7. The laminate according to claim 1, wherein the polyvinyl alcohol resin has a saponification degree of from 98% to 99.9% by mole.

8. The laminate according to claim 1, wherein the outer layer comprises polylactic acid and a succinic acid/1,4-butanediol/lactic acid polycondensate.

* * * * *